(12) United States Patent
Eller et al.

(10) Patent No.: US 10,035,653 B2
(45) Date of Patent: Jul. 31, 2018

(54) SYSTEMS AND METHODS FOR MANUAL HANDLING

(71) Applicant: Express Scripts, Inc., St. Louis, MO (US)

(72) Inventors: Charles E. Eller, Lake Saint Louis, MO (US); Jonathan W. Joplin, Chesterfield, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 204 days.

(21) Appl. No.: 15/201,845

(22) Filed: Jul. 5, 2016

(65) Prior Publication Data
US 2016/0311618 A1 Oct. 27, 2016

Related U.S. Application Data

(62) Division of application No. 13/412,370, filed on Mar. 5, 2012, now Pat. No. 9,394,107.

(Continued)

(51) Int. Cl.
| | | |
|---|---|---|
| *B65B 1/30* | (2006.01) | |
| *B65G 1/137* | (2006.01) | |
| *B65B 57/02* | (2006.01) | |
| *B65B 7/28* | (2006.01) | |
| *B65B 43/52* | (2006.01) | |
| *G06F 7/00* | (2006.01) | |
| *B07C 3/00* | (2006.01) | |
| *B07C 5/34* | (2006.01) | |
| *B21B 41/00* | (2006.01) | |

(Continued)

(52) U.S. Cl.
CPC .............. *B65G 1/1378* (2013.01); *B07C 3/00* (2013.01); *B07C 5/34* (2013.01); *B07C 5/3412* (2013.01); *B07C 5/36* (2013.01); *B07C 5/361* (2013.01); *B07C 5/38* (2013.01); *B21B 41/00* (2013.01); *B65B 5/04* (2013.01); *B65B 7/2807* (2013.01); *B65B 7/2842* (2013.01); *B65B 43/52* (2013.01); *B65B 57/02* (2013.01); *B65G 1/1373* (2013.01); *B67B 3/02* (2013.01); *B67B 3/06* (2013.01); *B67B 3/26* (2013.01); *G06F 7/00* (2013.01); *G06Q 10/087* (2013.01)

(58) Field of Classification Search
CPC ...... B65G 1/1378; B65G 1/1373; B65B 5/04; B65B 57/02; B65B 43/52; B65B 7/2807; B65B 7/2842; B67B 3/02; B67B 3/26; B67B 3/06; B07C 5/36; B07C 5/38; B07C 5/361; B07C 5/3412; B21B 41/00; G06F 7/00; G06Q 10/087

See application file for complete search history.

(56) References Cited

U.S. PATENT DOCUMENTS

| | | |
|---|---|---|
| 5,771,657 A | 6/1998 | Lasher |
| RE40,510 E | 9/2008 | Lasher et al. |

(Continued)

*Primary Examiner* — Jason K Niesz
(74) *Attorney, Agent, or Firm* — Husch Blackwell LLP

(57) ABSTRACT

Method and systems for manual handling are described. In one embodiment, a holding section, a distribution section and a manual section are provided. The holding section is adapted to hold the container during manual handling. The distribution section is adjacent the holding section and includes a robot adapted to select and pick containers from the holding section. The robot is disposed to distribute the container. The manual section is disposed adjacent the conveyor. The manual section is adapted for inspection or filling of the container. Additional methods and systems are disclosed.

20 Claims, 9 Drawing Sheets

Related U.S. Application Data

(60) Provisional application No. 61/449,523, filed on Mar. 4, 2011.

(51) Int. Cl.
*B07C 5/36* (2006.01)
*B07C 5/38* (2006.01)
*B67B 3/02* (2006.01)
*B67B 3/06* (2006.01)
*B67B 3/26* (2006.01)
*B65B 5/04* (2006.01)
*G06Q 10/08* (2012.01)

(56) References Cited

U.S. PATENT DOCUMENTS

2005/0171813 A1 8/2005 Jordan
2006/0074521 A1 4/2006 Rice et al.
2012/0245728 A1 9/2012 Koholka

SYSTEMS AND METHODS FOR MANUAL HANDLING

CROSS-REFERENCE TO A RELATED APPLICATION

This application is a divisional application of Ser. No. 13/412,370 filed on Mar. 5, 2012 which application claims priority under 35 U.S.C. § 119(e) to U.S. Provisional Patent Application No. 61/449,523 filed on Mar. 4, 2011. The entire disclosure of U.S. Ser. No. 13/412,370 and Provisional Patent Application No. 61/449,523 are hereby incorporated herein by reference.

FIELD

The present application relates generally to the technical field of automated filling centers. In a specific example, the present application may relate to a high volume fulfillment center, e.g., a high volume pharmacy and to systems and devices used in filling prescriptions and prescription orders at a high volume pharmacy.

BACKGROUND

A high-volume pharmacy, such as a mail order pharmacy, may process and fill a large number of prescriptions and prescription orders. Automated systems may be used by a high volume pharmacy to process and fulfill prescriptions.

Frequently, more than one prescription drug is required to complete a prescription order. The fulfillment of prescriptions in the prescription order may be fulfilled in different areas of the high-volume pharmacy. After fulfillment, the fulfilled prescriptions are gathered into a complete prescription order for shipping.

DETAILED DESCRIPTION

Example systems and methods for manual handling are described. In the following description, for purposes of explanation, numerous specific details are set forth in order to provide a thorough understanding of example embodiments. It will be evident, however, to one of ordinary skill in the art that these embodiments may be practiced without these specific details.

Generally, a prescription order is generated for a high volume pharmacy. The prescription order may include more than one prescription drug for fulfillment. Each prescription drug in a prescription order is an order component of the prescription order. Generally, the order components are containers having a quantity of a prescription drug therein.

The prescription drugs may be dispensed at various sections of the high volume pharmacy. Some prescription orders may require manual fulfillment of order components. Other order components that are fulfilled by automation may require manual inspection. The selection and distribution of order components necessitating manual fulfillment or inspection is provided by a holding section, a distribution section and a manual section. In general, manual handling includes manual fulfillment of prescription drugs or inspection of a container and/or prescription drugs. The holding section holds the order components not needing manual handling while the order component requiring manual handling is distributed at the distribution section. In some embodiments, the distribution section may distribute the order component not requiring manual handling to the holding section. Manual handling occurs at the manual section, from which the order component is returned for reuniting with companion order components to group the prescription order.

Figure 1:
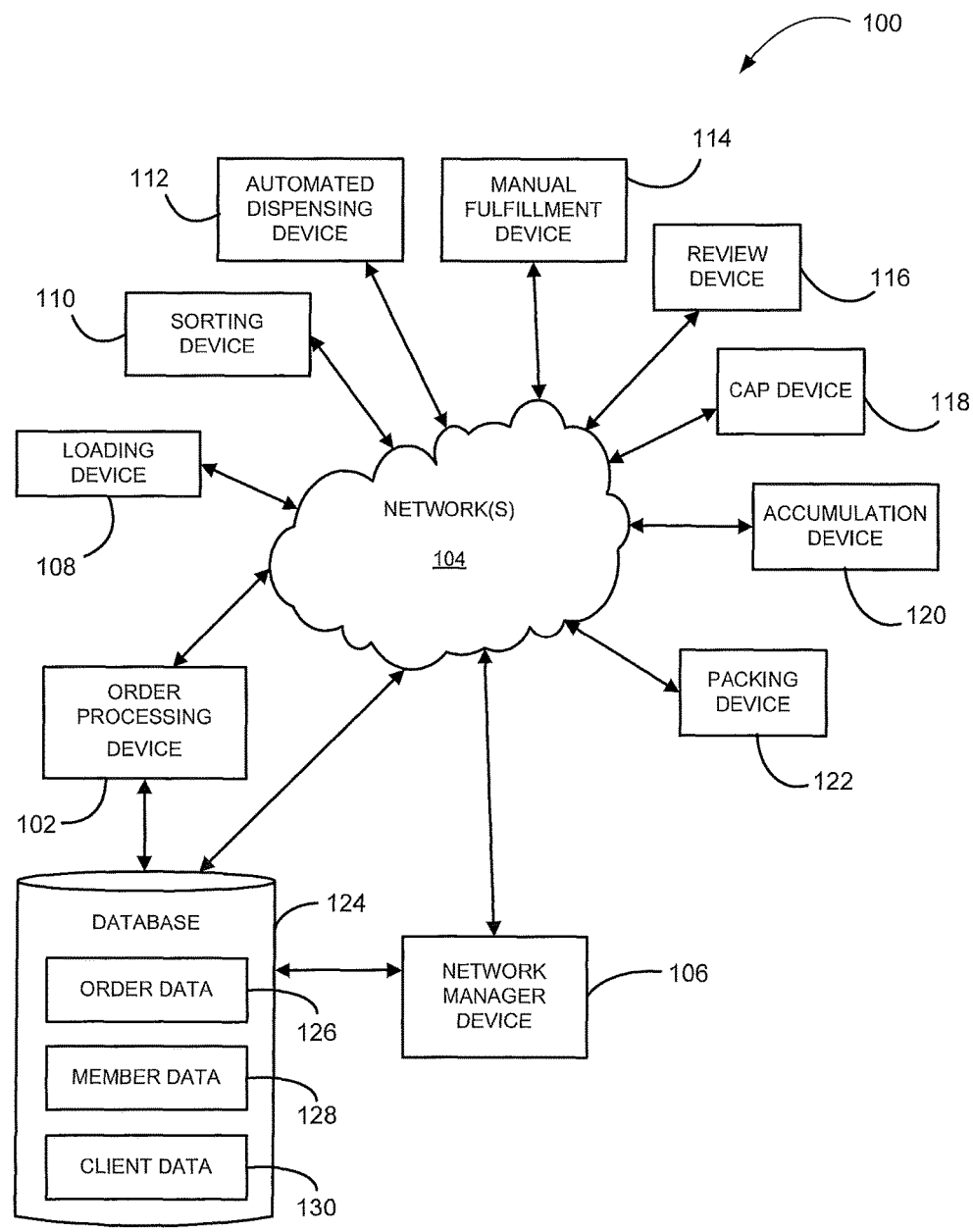
FIG. 1 is a block diagram of an example system according to an example embodiment.

FIG. 1 is a block diagram of an example system 100, according to an example embodiment. While the system 100 is generally described as being deployed in a high volume pharmacy, the automated filling system 100 may otherwise be deployed. The system 100 may include an order processing device 102 in communication with a network manager device 106 over a network 104.

The order processing device 102 may receive information about prescriptions being filled at a pharmacy in which the order processing device 102 is deployed. The order processing device 102 may track a prescription order as it is fulfilled. The order processing device 102 may make routing decisions and/or order consolidation decisions for a prescription order. The order processing device 102 may operate on its own or in combination with the network manager device 106.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The network manager device 106 is a device operated by an entity at least partially responsible for creation and/or management of the pharmacy benefit. While the network manager operating the network manager device 106 is typically a pharmacy benefit manager, other entities may operate the network manager device 106 either on behalf of themselves, the PBM, or another entity. The network manager device 106 may include a processor, memory to store data and instructions, and a communication device.

Some of the operations of the PBM that operates the network manager device 106 may include the following. A member (or a person on behalf of the member) attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of the client with the PBM. The member's co-pay may be based on a flat co-pay (e.g., $10), coinsurance (e.g., 10%), and/or a deductible (e.g., for first $500 of annual prescription drug spend) for certain prescription drugs, certain types of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug.

In conjunction with receiving the co-pay (if any) from the member and dispensing the prescription drug to the member, the pharmacy submits a claim to the PBM for the prescription drug. The PBM may perform certain adjudication functions including verifying the eligibility of the member, reviewing the formulary to determine appropriate co-pay, coinsurance, and deductible for the prescription drug, and performing a drug utilization review (DUR) on the member. The PBM then adjudicates the claim associated with the prescription drug and provides a response to the pharmacy following performance of the aforementioned functions. As part of the adjudication, the client (or the PBM on behalf of the client) ultimately reimburses the pharmacy for filling the prescription drug when the prescription drug was successfully adjudicated. The aforementioned adjudication functions generally occur before the co-pay is received and the prescription drug dispensed. However, the operations may occur simultaneously, substantially simultaneously, or in a different order. In addition, more or less adjudication functions may be performed as part of the adjudication process. Adjudication may be performed through the use of a machine, such as a computer system.

The amount of reimbursement paid to the pharmacy by the client and/or member may be based at least in part on the type of pharmacy network in which the pharmacy is included. Other factors may be used to determine the reimbursement amount in addition to the type of pharmacy network. The above methodologies may be implemented by executing instructions in the network manager device 106.

The system 100 may include a loading device 108, a sorting device 110, an automated dispensing device 112, a manual fulfillment device 114, a review device 116, a cap device 118, an accumulation device 120 and/or a packing device 122.

The loading device 108 may load prescription containers by a robotic arm, pick and place mechanism, or the like. In one embodiment, the loading device 108 has robotic arms or pickers to grasp a container and move it to and from a pallet. The pallet may be located on a conveyor assembly.

The sorting device 110 may receive containers and may identify the containers that belong to a particular prescription drug order. The sorting device 110 may group the containers according to the prescription drug order in which they belong.

The automated dispensing device 112 includes one or more devices that dispense prescription drugs or pharmaceuticals into containers in accordance with one or more prescription orders. Various automated dispensing systems are available commercially such as e.g., the system sold under the trademark OPTIFILL by AmerisourceBergen Corporation.

The manual fulfillment device 114 provides for manually fulfilling prescriptions. In general, a manual fulfillment may include operations at least partially performed by a pharmacist or pharmacy technician. For example, a person may retrieve a supply of the prescribed drug, may make an observation, may count out a prescribed quantity of drugs and place them into a container, or the like. Some portions of the manual fulfillment process may be automated by use of a machine. For example, counting of capsules, tablets or pills may be at least partially automated (e.g., through use of a pill counter). In some embodiments, the automated fulfillment is integrated with the manual fulfillment operations. Certain automated fulfillment may be performed before manual fulfillment and vice versa. The automated fulfillment for a prescription may be paused to allow for the manual fulfillment to be completed. Once the devices receive an input that manual fulfillment is complete, then the automated fulfillment is released and fulfillment proceeds automatically.

The review device 116 may process containers to be reviewed by a pharmacist. Fulfilled prescriptions may be reviewed and/or verified by a pharmacist, as may be required by state or local law. In other embodiments, prescriptions are reviewed and/or verified for quality assurance. A pharmacist or other licensed person who may dispense certain drugs in compliance with local and/or other laws may operate the review device 116 and visually inspect a container that has been filled with a prescription drug. The pharmacist may review, verify, and/or evaluate drug quantity, drug strength, and/or drug interaction concerns, or otherwise perform pharmacist services.

The cap device 118 may be used to cap a container. In some embodiments, the cap device 118 may provide a type of cap in accordance with a patient preference (e.g., a preference regarding child resistance). The cap device 118 may provide a crown portion, such as a ring or top, to cap the container. The ring or top operates cooperatively to provide child resistance. In other embodiments, no ring or top over a container may provide an easily-opened cap (e.g., for patients with fine motor disabilities).

The accumulation device 120 accumulates various prescription drugs in a prescription order. The accumulation device 120 may accumulate prescription containers from various area of the high volume fulfillment center. For example, the accumulation device 120 may accumulate prescription containers from the automated dispensing device 112, the manual fulfillment device 114 and the review device 116.

The packing device 122 packages a prescription order in preparation for shipping the order. The packaging device 122 may box or bag the fulfilled prescription order for delivery. The packaging device 122 may further place inserts into the box or bag. The packaging device 122 may label the box or bag with the address. The packaging device 122 may sort the box or bag for mailing in an efficient manner (e.g., sort by delivery address).

While the system 100 in FIG. 1 is shown to include single devices 102, 106, 108, 110, 112, 114, 116, 118, 120, 122 multiple devices may be used. The devices 102, 106, 108 110, 112, 114, 116, 118, 120, 122 may be the same type of device or may be different device types. When multiple devices are present, the multiple devices may be of the same device type or may be a different device type. Moreover, system 100 shows a single network 104; however, multiple networks can be used. The multiple networks may communicate in series with each other to link the devices 102, 106, 108 110, 112, 114, 116, 118, 120, 122 or in parallel to link the devices 102, 106, 108, 110, 112, 114, 116, 118, 120, 122. Multiple devices may share processing and/or memory resources. The devices 102-122 may be located in the same area or in different locations. For example, the devices 102-122 may be located in a building or set of adjoining buildings. The devices 102-122 may be interconnected (e.g. by conveyors), networked or otherwise in contact with one another.

In some embodiments, at least some of the functionality of the order processing device 102 may be included in the network manager device 106. In other embodiments, at least some of the functionality of the order processing device 102 may be included in the manual fulfillment device 114 and/or the review device 116 and vice versa.

The order processing device 102 may be in a client-server relationship with the network manager device 106, a peer-to-peer relationship with the network manager device 106, or in a different type of relationship with the network manager device 106.

The order processing device 102 and/or the network manager device 106 may be in communication directly (e.g., through local storage) and/or through the network 104 (e.g., in a cloud configuration or software as a service) with a database 124 (e.g., as may be retained in memory or otherwise). The database 124 may store order data 126, member data 128 and/or client data 130.

The order data 126 may include data used for completion of the prescription, such as prescription materials. Prescription materials are a type of order materials that include an electronic copy of information regarding the prescription drug for inclusion with the fulfilled prescription. The prescription materials may include electronic information regarding drug interaction warnings, recommended usage, possible side effects, expiration date, date of prescribing, etc.

The member data 128 includes information regarding the members associated with the benefit manager. Examples of the member data 128 include name, address, telephone number, e-mail address, prescription drug history, and the like. The member data 128 may include a client identifier that identifies the client associated with the member and/or a member identifier that identifies the member to the client. The member data 128 may include a member identifier that identifies the client associated with the patient and/or a patient identifier that identifies the patient to the client. The member data 128 may also include, by way of example, dispensation preferences such as type of label, type of cap, message preferences, language preferences, or the like. The member data 128 may be accessed by the devices 102, 106-122 to obtain the necessary information for fulfilling the prescription and shipping the prescription drugs.

The client data 130 includes information regarding the clients of the benefit manager. Examples of the client data 130 include company name, company address, contact name, contact telephone number, contact e-mail address, and the like.

Figure 2:
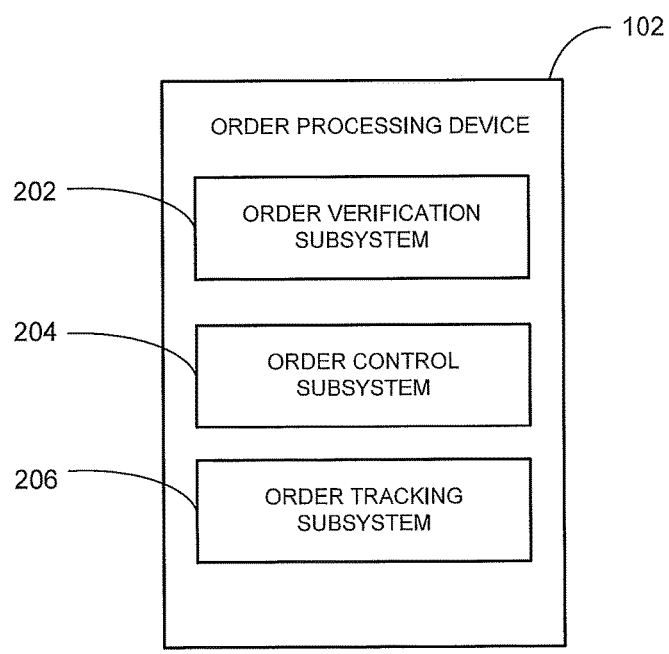
FIG. 2 is a block diagram of an example order processing device that may be deployed within the system of FIG. 1, according to an example embodiment.

FIG. 2 illustrates the order processing device 102, according to an example embodiment. The order processing device 102 may be used by one or more operators to generate prescription orders, make routing decisions, and/or make prescription order consolidation decisions. For example, the prescription order may be comprised of order components. The order processing device 102 may receive instructions to fulfill an order without operator intervention. An order component may include a prescription drug fulfilled in a container by the system 100. The order processing device 102 may direct an order component to the manual fulfillment device 114 or the review device 116 and direct other components to the automated dispensing device 112. The order processing device 102 may direct all order components to the accumulation device 120 for aggregation before shipping. The order processing device 102 may direct the order components directly to the packing device 122 if the prescription order does not require accumulation from various areas of the pharmacy for completion. The order processing device 102 may be deployed in the system 100, or may otherwise be used.

The order processing device 102 may include an order verification subsystem 202, an order control subsystem 204 and/or an order tracking subsystem 206.

The order verification subsystem 202 may communicate with the network manager device 106 to verify the eligibility of the member, review the formulary to determine appropriate co-pay, coinsurance, and deductible for the prescription drug, and/or perform a drug utilization review (DUR).

The order control subsystem 204 controls various movements of the containers and/or pallets along with various filling functions during progression through the system 100. For example, the order control subsystem 204 may identify the prescribed drug as needing to be fulfilled manually and may direct the container or order component to the manual fulfillment device 114 to achieve the manual fulfillment. The devices 108-122 may be interconnected by a system of conveyors or other container movement systems. Thus, the order control subsystem 204 may control various conveyors to deliver the pallet from the loading device 108 to the manual fulfillment device 114, for example.

The order tracking subsystem 206 tracks a prescription order as it progresses (or stops) toward fulfillment. The order tracking subsystem 206 may track, record and/or update order history, order status or the like. The order tracking subsystem 206 may store data locally (e.g., in a memory) or at the order data 124.

Figure 3:
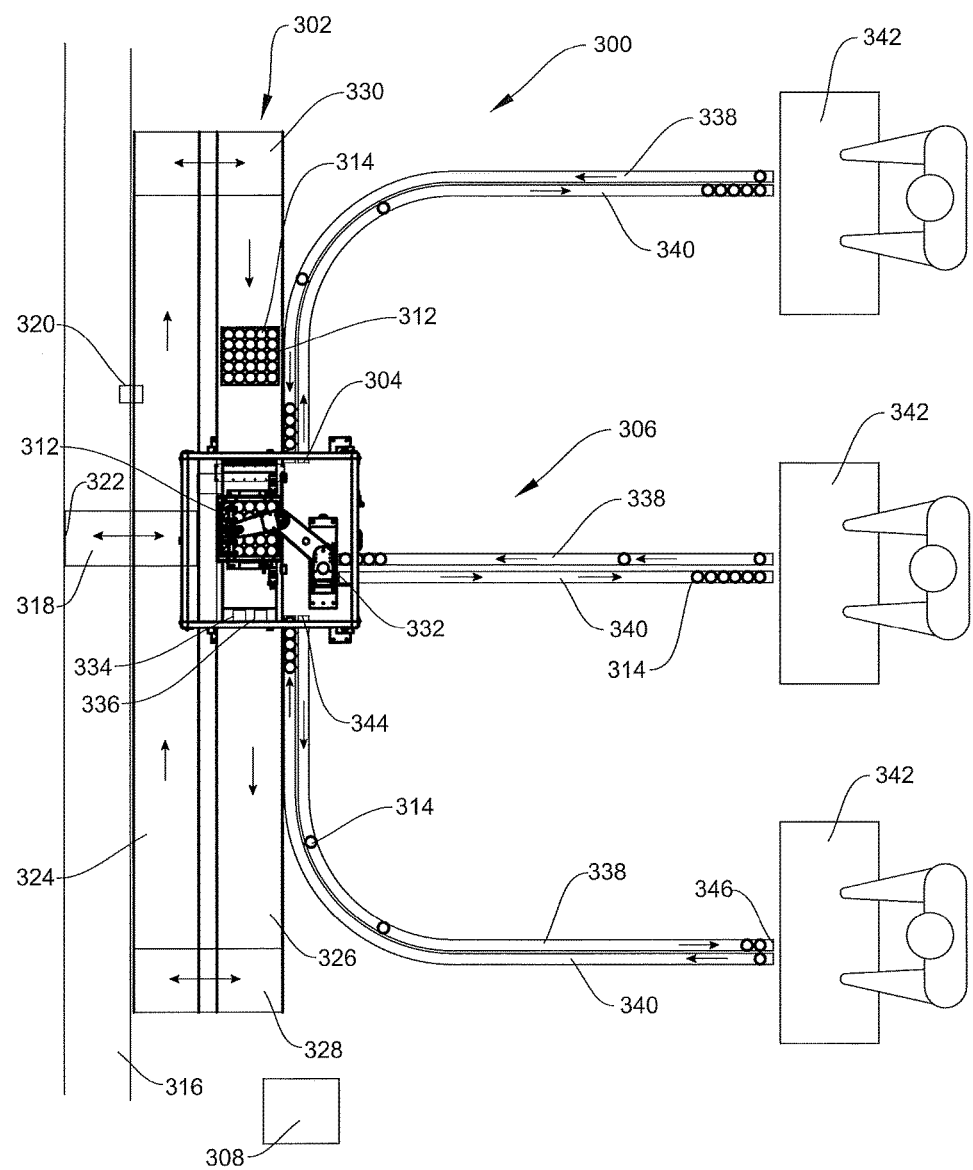
FIG. 3 is a schematic representation of the manual fulfillment device or the review device that may be deployed within the system of FIG. 1, according to an example embodiment.

FIG. 3 illustrates a manual fill center 300 according to an example embodiment. The manual fulfillment device 114 and/or the review device 116 may include the manual fill center 300.

The manual fill center 300 may include a holding section 302, a distribution section 304, multiple manual sections 306, and a control unit 308. The pallets 312 securely hold one or more containers 314 therein. The container 314 may represent an order component of a prescription order. More than one order component may constitute a prescription order.

The holding section 302 is disposed between the distribution section 304 and a feed conveyor 316. The feed conveyor 316 supplies pallets 312 with the containers 314 for manual handling.

A first transfer area 318 is provided as a connection between the holding section 302 and the feed conveyor 316. The pallet 312 may be identifiable by having a label, bar code, RFID tag, or the like thereon. The first transfer area 318 may include a reader 320 (e.g., RFID reader, optical reader or the like) for reading a label (e.g., RFID tag, bar code, QR code, etc.) on the pallet 312 and a transfer actuator 322 for transferring the pallet 312 from the feed conveyor 316 to the holding section 302. The transfer actuator 322 may be a lift transfer unit (e.g., from Bosch Rexroth of Hoffman Estates, Ill.), or may be a robotic mechanism to lift or push the pallet 312 from the feed conveyor 316 to the holding section 302. The transfer actuator 322 may be one or more devices, mechanisms, and/or methods adapted to move a pallet 312 to or from one conveyor to another (e.g., by sliding, lifting and replacing, and/or otherwise moving, transferring, transporting, and/or relocating). The reader 320 may be a barcode reader, an RFID reader, an image scanner (e.g., an image scanner equipped with and/or directly or indirectly connected to a computer system equipped with an optical character recognition system), and/or other optical, mechanical, electrical, and/or audio device capable of reading and/or otherwise obtaining information from the object being read, e.g., a label.

The holding section 302 may include a first holding conveyor 324, a second holding conveyor 326, a first holding transfer actuator 328 and a second holding transfer actuator 330. The first holding conveyor 324 may be disposed substantially parallel to the second holding conveyor 326 adjacent the feed conveyor 316. The second holding conveyor 326 may be disposed adjacent the distribution section 304. The first and second holding conveyors 324, 326 may move in opposite directions so as to move the pallets 312 in opposite directions. The first holding transfer actuator 328 and the second holding transfer actuator 330 may be disposed at ends of the first and second holding conveyors 324, 326.

For example, as a pallet 312 reaches the end of the first holding conveyor 324, it is moved to the second holding conveyor 326 by the first holding transfer actuator 328. At the opposite end, the second holding transfer actuator 330 may move a pallet 312 from the second holding conveyor 326 to the first holding conveyor 324. In an embodiment, the directions of the conveyors 324, 326 and the transfer actuators 328, 330 may be reversed. Other conveyors may be used, such as a continuous, circulating conveyor (e.g., a substantially oval-shaped conveyor).

The distribution section 304 may include a robot 332, a scanner 334 and a labeler 336. In an example embodiment, the container 314 is unloaded by the robot 332 and distributed to the manual section 306. The robot 332 may be adapted to pick the container 314 from the pallet 312 on the second holding conveyor 326 and scan or label the container 314. The container 314 may be empty and/or uncapped. In some embodiments, the container 314 may not be empty, may contain a quantity of a prescription drug and/or may be capped. In an embodiment in which the container 314 is empty and uncapped, the robot 332 may be adapted to obtain the container 314 and move it to the labeler 336 for labeling. The robot 332 may be adapted to move the labeled container 314 to the scanner 334 for scanning. The scanner 334 may include an image sensor that captures an image of the container 314 with the label and/or a barcode scanner. The robot 332 may be adapted to spin the container 314 for the scanner 334 to obtain attributes, such as identifying data, from the label. Other devices may be used to remove the container 314 from the pallet 312, or the container 314 may be manually removed.

After the robot 332 has picked the desired container 314 from the pallet 312, the second holding conveyor 326 may begin to move the pallet 312 away from the distribution section 304 to allow other pallets 312 to move adjacent the distribution section 304. The first holding conveyor 324, the second holding conveyor 326, the first holding transfer actuator 328 and the second holding transfer actuator 330 may circulate the pallet 312 in a holding pattern. In some embodiments, the robot 332 will not empty the pallet 312. That is, the pallet 312 will contain order components that make up a prescription order together with the container 314 picked by the robot 332. In this case, order components not selected by the robot 332 may be already filled or may be filled at a later time outside of the manual fill center 300. The order components in the pallet 312 may await the return of the containers 314 from the manual section 306. Upon return, the robot 332 may be adapted to place the container 314 into the pallet 312 with its respective order components that together complete a prescription order.

The distribution section 304 may further include a delivery conveyor 338 and a return conveyor 340. The manual section 306 may include a handling area 342. The delivery conveyor 338 receives the container 314 from the robot 332 at a first end 344 and delivers the container 314 to the handling area 342 at a second end 346. The return conveyor 340 receives the container 314 at the second end 346 and delivers the container 314 to the distribution section 304 at the first end 344. The handling area 342 may be operated by a pharmacy technician, pharmacist or the like to fill the container 314 with a prescription drug and/or to inspect the container 314. Inspection may include, for example, verifying correct data on the label, verifying quantity of the prescription drug, and/or verifying the correct prescription drug. In some embodiments, containers 314 may be introduced into the manual fill center 300 by manual labeling of the container 314 and/or manual fulfillment of the prescription drug in the container 314 at the handling area 342 with placement on the return conveyor 340 to merge with a prescription order on the pallet 312.

The delivery conveyor 338 and the return conveyor 340 may be straight or curved according to the space available and location of the handling area 342.

Figure 4:
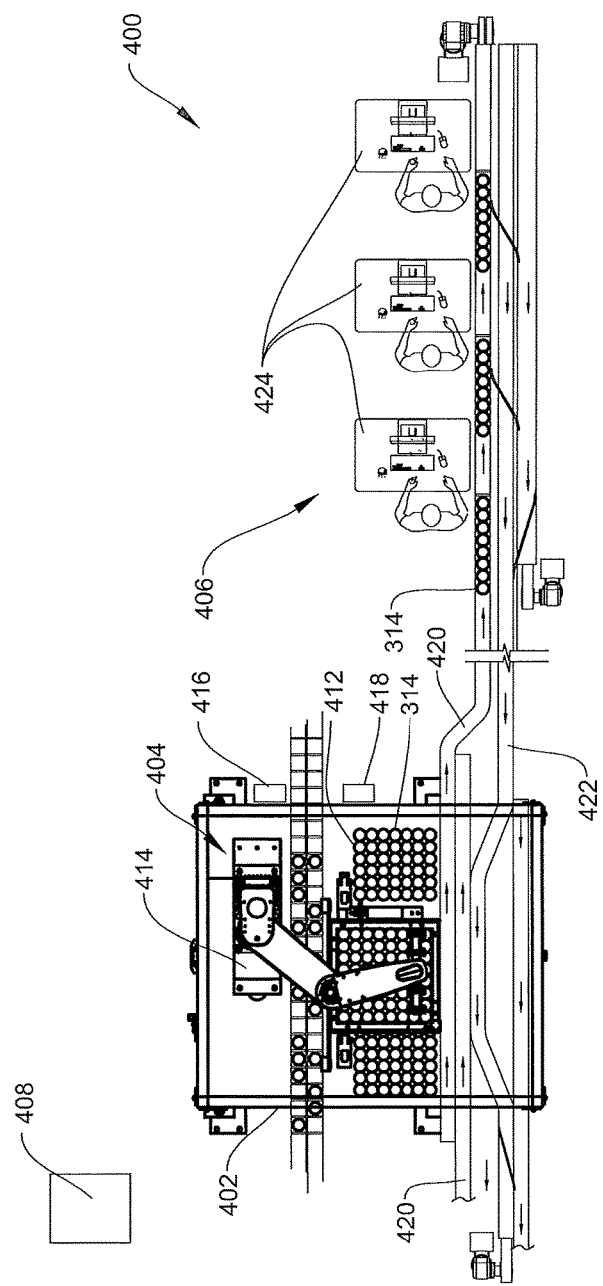
FIG. 4 is a schematic representation of the manual fulfillment device or the review device that may be deployed within the system of FIG. 1, according to an example embodiment.

Referring now to FIG. 4, a manual fill center 400 is illustrated according to an example embodiment. The manual fill center 400 may be deployed in the manual fulfillment device 114 and/or the review device 116. The manual fill center 400 may include a holding section 402, a distribution section 404, multiple manual sections 406 and a control unit 408. The holding section 402 is disposed adjacent the distribution section 404.

The holding section 402 may include a stationary pallet 412 for holding containers 314. The distribution section 404 may include a robot 414, a scanner 416 and a labeler 418. The robot 414 is adapted to pick containers and place them in the pallet 412. The robot 414 may pick the container 314 and move it to the scanner 416 and/or the labeler 418 to scan or label the container 314. In an example embodiment, containers 314 are unloaded by the robot 414 and containers 314 are distributed to the manual section 406. The container 314 may be empty and/or uncapped. In other embodiments, the container 314 may not be empty, may contain a quantity of a prescription drug and/or may be capped or uncapped. In one embodiment in which the container 314 is empty and uncapped, the robot 414 may be adapted to obtain the container 314 and move it to the labeler 418 for labeling. The robot 414 may be adapted to move the labeled container 314 to the scanner 416 for scanning. The scanner 416 may include an image sensor that captures an image of the container 314 with the label and/or a barcode scanner. The robot 414 may be adapted to spin the container 314 for the scanner 416 to obtain attributes from the label. In an embodiment in which the container 314 contains a quantity of a prescription drug, the container 314 may be labeled before reaching the manual fill center 400. In such an embodiment, the robot 414 positions the container 314 to be scanned by the scanner 416 without labeling.

The distribution section 404 may further include a delivery conveyor 420 and a return conveyor 422. The manual section 406 may include a handling area 424. The delivery conveyor 420 and the return conveyor 422 may be straight or curved according to the space available and location of the manual section 406. The delivery conveyor 420 may deliver the container 314 to the robot 414 and may deliver the container 314 to the handling area 424. The return conveyor 422 receives the container 314 at the handling area 424 and delivers the container 314 to the distribution section 304. The return conveyor 422 may move the container 314 from the robot 414 to exit the manual fill center 400. The handling area 424 may be operated by a pharmacy technician, a pharmacist, or the like to either fill the container 314 with a prescription drug and/or to inspect the container 314. Inspection may include, for example, verifying correct data on the label, verifying quantity of the prescription drug, and/or verifying the correct prescription drug. In some embodiments, containers 314 may be introduced into the manual fill center 400 by manual labeling of the container 314 and/or manual fulfillment of the prescription drug in the container 314 at the handling area 424 with placement on the return conveyor 422 to merge with a prescription order at the stationary pallet 412. The containers 314 not requiring manual inspection or manual fulfillment but are apart of a prescription order with a container requiring manual inspection or manual fulfillment may be moved to the stationary pallet 412 for temporary storage. Prescription orders not requiring any containers 314 to be manually inspected or manually fulfilled may be unloaded directly from the stationary pallet 412 to the return conveyor 422.

Figure 5:
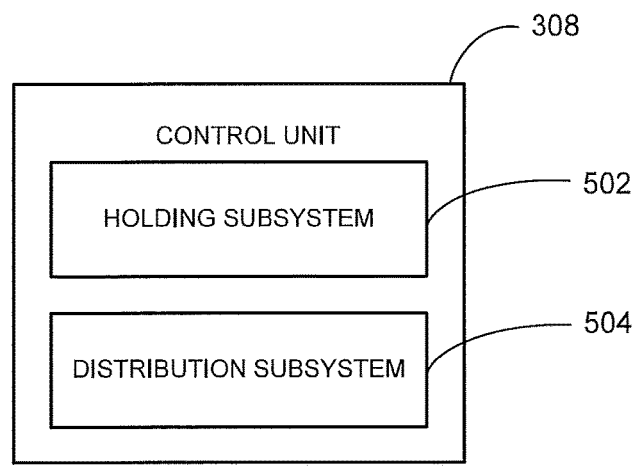
FIG. 5 is a block diagram of a control unit that may be deployed within the device of FIGS. 3 and 4, according to an example embodiment.

Referring to FIG. 5, the control unit 308 is illustrated according to an example embodiment. The control unit 308 may be deployed in the manual fill center 300, 400. The control unit 308 may be communicatively connected to one or more components in the holding section 302, 402, the distribution section 304, 404 and/or the manual section 306, 406. The control unit 308 may include a holding subsystem 502 and a distribution subsystem 504. The holding subsystem 502 enables the manual fill center 300 to manage operations of the holding section 302, 402. The distribution subsystem 504 enables the manual fill center 300, 400 to manage operations of the distribution section 304, 404.

Figure 6:
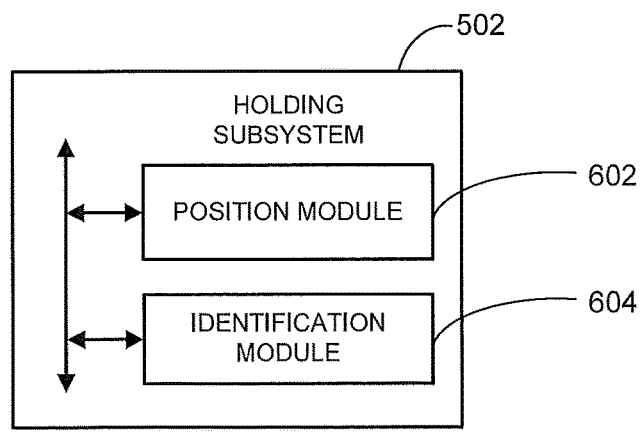
FIG. 6 is a block diagram of a holding subsystem that may be deployed within the control unit of FIG. 5, according to an example embodiment.

FIG. 6 illustrates an example holding subsystem 502 that may be deployed in the control unit 308, order processing device 102 or otherwise deployed in another system. One or more modules are communicatively coupled and included in the holding subsystem 502 to enable management of the pallet 312 and/or the container 314 in the holding section 302, 402. The modules of the holding subsystem 502 that may be included are a position module 602 and/or an identification module 604. Other modules may also be included.

In some embodiments, the modules of the holding subsystem 502 may be distributed so that some of the modules are deployed in the manual fulfillment device 114 and/or the review device 116 and some modules are deployed in the order processing device 102. In one embodiment, the modules are deployed in memory and executed by a processor coupled to the memory. The functionality contained within the modules 602, 604 may be combined into a lesser number of modules, further divided among a greater number of modules, or redistributed among existing modules. Other configurations including the functionality of the modules 602, 604 may be used.

The position module 602 manages movement of the pallet 312 with the container 314 while at the holding section 302. For example, the position module 602 may command movement of the first and second holding conveyors 324, 326 and the first and second holding transfer actuators 328, 330. The position module 602 may determine the position that the container 314 is placed and held in the stationary pallet 412 while at the holding section 402.

The identification module 604 may be in communication with the reader 320 that may read an RFID tag attached to the pallet 312. The identification module 604 may communicate with the processing device 102 and/or the loading device 108 to access information on the prescription orders in the pallet 312 to determine whether any order components of the prescription orders require manual handling. The identification module 604 may access information on the position of the order components within the pallet 312 from the position module 602 and select desired order components via the robot 332, 414. The identification module 604 may communicate with the scanner 334, 416 to determine the proper distribution of the order component.

Figure 7:
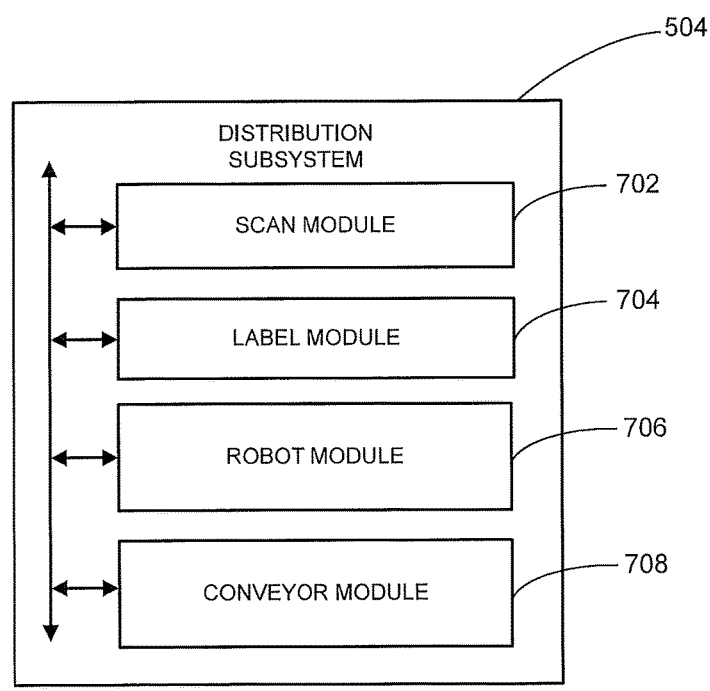
FIG. 7 is a block diagram of an distribution subsystem that may be deployed within the control unit of FIG. 5, according to an example embodiment.

FIG. 7 illustrates an example distribution subsystem 504 that may be deployed in the control unit 308, order processing device 102, or otherwise deployed in another system. One or more modules are communicatively coupled and included in the distribution subsystem 504 to distribute the container 314 in the distribution section 304, 404. The modules of the distribution subsystem 504 that may be included are a scan module 702, a label module 704, a robot module 706 and/or a conveyor module 708. Other modules may also be included.

In some embodiments, the modules of the distribution subsystem 504 may be distributed so that some of the modules are deployed in the manual fulfillment device 114 and/or the review device 116 and some modules are deployed in the order processing device 102. In one embodiment, the modules are deployed in memory and executed by a processor coupled to the memory. The functionality contained within the modules 702-708 may be combined into a lesser number of modules, further divided among a greater number of modules, or redistributed among existing modules. Other configurations including the functionality of the modules 702-708 may be used.

The scan module 702 may be in communication with the scanner 334, 416 and/or order processing device 102, for example. The scan module 702 may obtain data regarding the attributes of the container 314 and/or its label. Data obtained by the scan module 702 may be stored locally or remotely, such as at the database 124. Data obtained by the scan module 702 may be cross referenced to data that is already stored locally or remotely to determine that the correct container 314 has been selected and requires manual fulfillment or manual inspection.

The label module 704 may operate the labeler 336, 418 and provide identifying data for printing by the labeler 336, 418. Identifying data for printing may include prescription drug information, patient identification, order identification, dosage information, or the like.

The robot module 706 may operate the robot 332, 414 to selectively pick the container 314 from the pallet 312 or the delivery conveyor 420. The robot module 706 may communicate with the order processing device 102, the scan module 702, and/or the label module 704, for example, to coordinate scanning and labeling of the container 314. The robot module 706 may communicate with the order processing device 102 to coordinate distribution to the manual section 306.

Once the container 314 is scanned, identifying information may be compared against identifying prescription order data obtained from the order processing device 102, for example. If a matching prescription order exists, the robot module 706 may operate the robot 332, 414 to distribute the container 314. If not a match, the robot module 706 may reject the container 314 and operate the robot 332, 414 to place the container 314 aside or distribute to the manual handling area 342, 424.

The conveyor module 708 may operate the distribution conveyor 338, 420 and the return conveyor 340, 422. The conveyor module 708 may communicate with the robot module 706 to coordinate placement and removal of the container 314 from the conveyor 338, 340, 420, 422.

Figure 8:
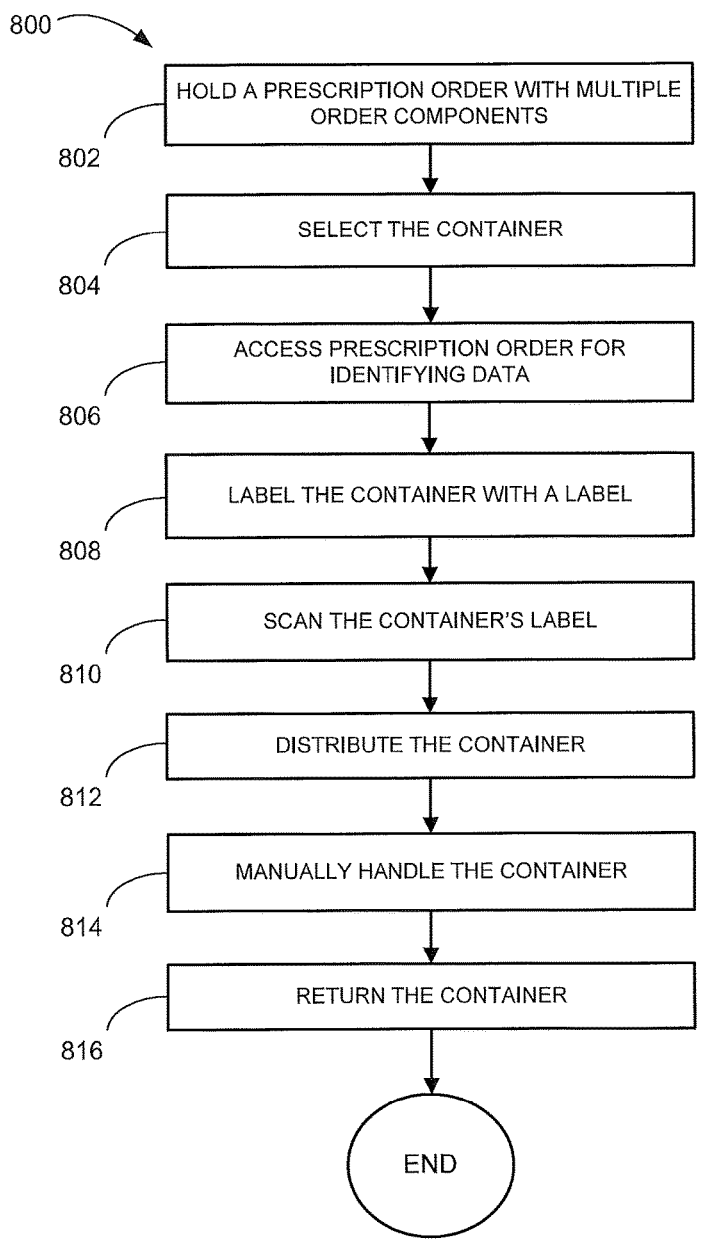
FIG. 8 is an example process flow illustrating a method of manual handling, according to an example embodiment.

FIG. 8 illustrates a method 800 for manual handling, according to an example embodiment. The method 800 may be performed by the manual fulfillment device 114, by the review device 116 and/or the processing device 102, or may be otherwise performed.

At block 802, the container 314 in the pallet 312 is held in the holding section 302. The pallet 312 may be identified via the reader 320 as including a container 314 to be manually handled. The reader 320 may be used to identify the pallet 312 as having the container 314 requiring manual handling. The order processing device 102 may signal the holding section 302 to hold the pallet 312. The transfer actuator 322 may transfer the pallet 312 from the feed conveyor 316 and place it on the first holding conveyor 324 of the holding section 302. The pallet 312 continues to be held while the container 314 is manually handled. In an example embodiment, a pallet's RFID tag (or other identification structure) is read each time it enters or approaches the distribution section 304. If the pallet 312 is identified as being associated with the container 314 that is returned from the manual section 306, the pallet 314 stops at the distribution section 304 via stopping of the second holding conveyor 326 or stops (not shown), for example. The manually-filled container 314 is placed back into the pallet 312 via the robot 332. At the pallet's 312 subsequent entry transfer area 318, its RFID tag may be read by the reader 320. In some embodiments, locations of the pallets 312 within the holding section 302 are indexed to facilitate prompt identification for return of the manually filled container 314 to its original pallet 312. If the pallet 312 is identified as having all manually-filled containers 314 returned, the lift transfer unit 318 may remove the pallet 312 from the first holding conveyor 324 and return it to the feed conveyor 316. If all manually-filled containers 314 are not returned, the pallet 312 with missing containers 314 may circulate within the holding section 302. The pallet 312 circulates via the first and second holding conveyors 324, 326 and the first and second transfer units 328, 330.

At block 804, the container 314 is picked from the holding section 302 by the robot 332. The robot module 706 may communicate with the identification module 604 to coordinate the picking of the container 314 requiring manual handling.

At block 806, a prescription order with multiple order components is accessed to provide identifying data for the container 314. The identifying data identifies an attribute of the order component. The order component may be the container 314 requiring manual handling, for example.

At block 808, the container 314 is labeled with a label having the identifying data thereon. The container 314 may be positioned and orientated at the labeler 336 by the robot 332 for labeling. In some embodiments, the container 314 may already be labeled in such a case, the robot 332 moves the container 314 to the scanner 334.

At block 810, the label of the container 314 is scanned by the scanner 334. The container 314 may be positioned and orientated at the scanner 334 by the robot 332 for scanning.

At block 812, the container 314 is distributed to the manual section 306. The robot 332 may distribute the container 314 to the distributing conveyor 338, which may deliver the container 314 to the handling area 342.

At block 814, the container 314 is manually handled according to the identifying data. Information about the container, such as the identifying data, may be provided to an operator, e.g., pharmacist and/or pharmacy technician, at the manual section 306. For example, contents of the container 314 may be checked against the identifying data on the label. In other examples, the container 314 may be filled with a prescription drug in accordance with the identifying data on the label of the container 314.

At block 816, the container 314 is returned. Returning the container may include returning via the return conveyor 340 to the distribution section 304 and/or the holding section 302. For example, the container 314 is placed on the return conveyor 340 that travels away from the manual section 306 to the distribution section 304, which acts as a reloading station for replacement of the container 314 into the pallet 312. The distribution section 303 may be a reloading station and an unloading station, for example. In other embodiments, separate reloading and unloading stations may be used. An unloading station or a reloading station may be any one or more points, positions, and/or stations that removes the container 314 from the pallet 312 and/or returns the container 314 to the pallet 312.

The manually-filled container 314 is released to the distribution section 304 and reunited with its originally assigned pallet 312. For example, upon or after leaving the manual section 306, a container's label may be read by the scanner 334, for example, and the scanned information may be used to associate the container 314 with its original pallet 312.

A pallet 312 may continue to be held in the holding section 302 until all manually-filled containers 314 have been returned to the pallet 312.

Figure 9:
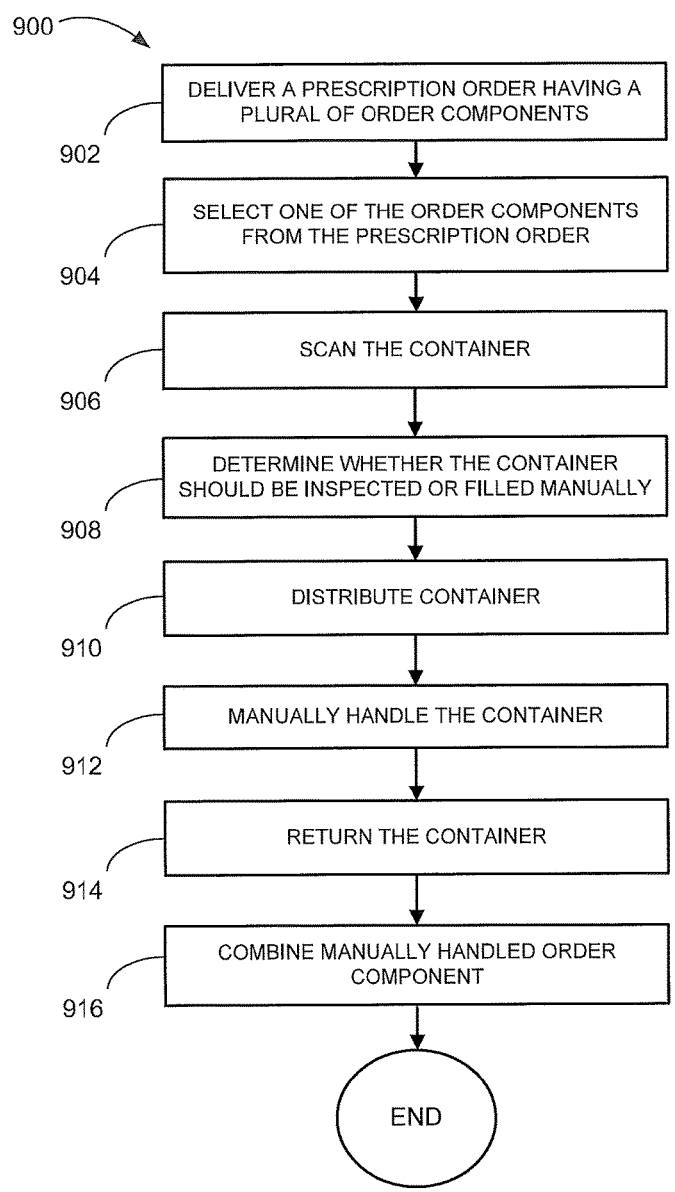
FIG. 9 is an example process flow illustrating a method of manual handling, according to an example embodiment.

FIG. 9 illustrates a method 900 for manual handling, according to an example embodiment. The method 900 may be performed by the manual fulfillment device 114, by the review device 116 and/or by the order processing device 102, or may be otherwise performed.

At block 902, a prescription order having multiple order components, e.g. containers 314, is delivered to the distribution section 402. The prescription order may be delivered by the delivery conveyor 420. At block 904, one of the order components from the prescription order is selected. The order component may be selected by the robot 414 from the delivery conveyor 420. At block 906, the order component is scanned by the scanner 416. The robot 414 may orientate the order component at the scanner 416. In one embodiment, the order component is labeled by the labeler 418 before scanning.

At block 908, a determination of whether the order component should be manually handled or held at the holding section 402 is made. The scanner 416 may be used to determine the proper distribution of the order component.

If the order component requires manual handling, the robot 414 may distribute the order component to the delivery conveyor 420, which may distribute the order component to the manual section 406, at block 910. Order components not requiring manual handling may be positioned in the stationary pallet 412 of the holding section 402 by the robot 414.

At block 912, the order component may be manually handled. For example, the order component may be checked for accuracy or may be filled with a prescription drug at the manual section 406. The manual handling may include sending a confirmation code from a device operated by the person (e.g., a pharmacist, pharmacy technician, chemist (e.g., in the UK), or other licensed/trained person to manually handle the order component) to other device and/or modules that interact with the prescription drug fulfillment.

At block 914, the order component is returned from the manual section 406 to the distribution section 404. The order component may be returned via the return conveyor 422. The manually handled order component is combined with its companion order components at block 916. The combining may include the robot 332, 414 picking the companion order components from the stationary pallet 412 and distributing onto the return conveyor 422 with the manually handled order component such that the prescription order is on the return conveyor 422. The manually handled order component may be scanned or otherwise identified to signal the robot 414 to pick the companion order components from the stationary pallet 412 and place on the return conveyor 422. In some embodiments, the robot 332, 414 returns the container 314 to the pallet 312 if the confirmation signal is received from the device associated with the manual fulfillment. The robot 332, 414 may set the container 314 at a different location if the confirmation signal is not received.

Figure 10:
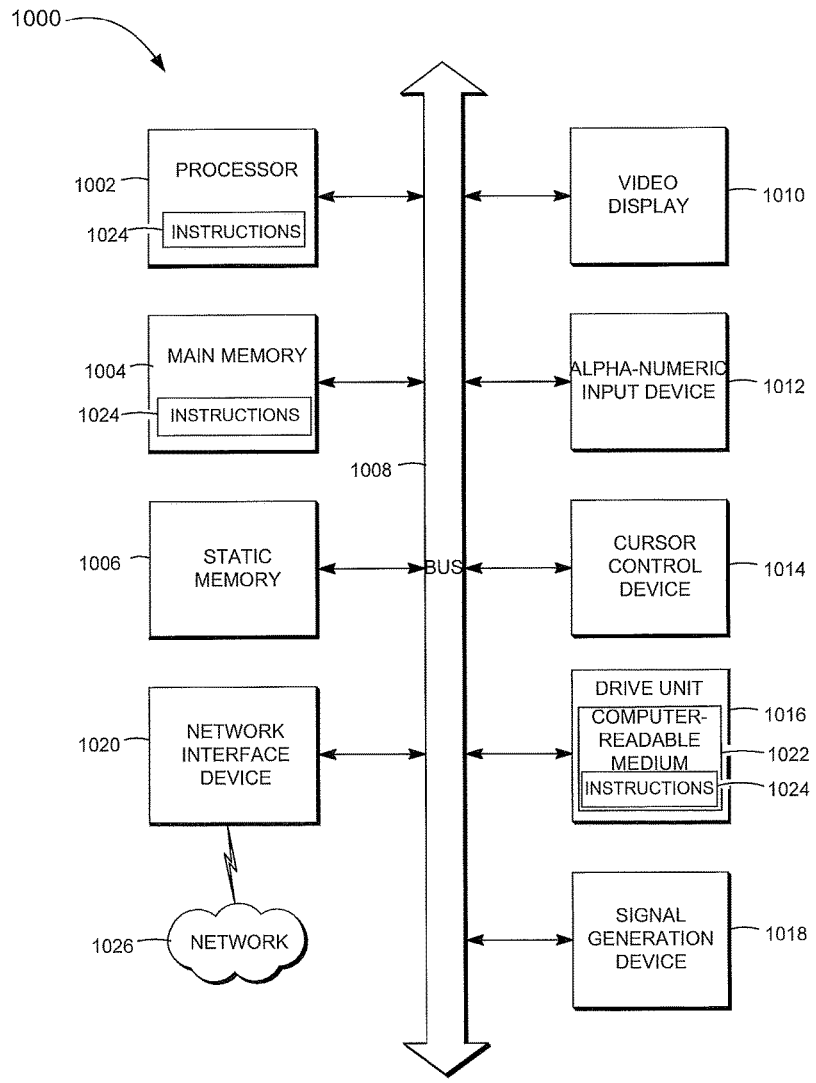
FIG. 10 is a block diagram of a machine in the example form of a computer system within which a set of instructions for causing the machine to perform any one or more of the methodologies discussed herein may be executed or stored.

FIG. 10 shows a block diagram of a machine in the example form of a computer system 1000 within which a set of instructions may be executed causing the machine to perform any one or more of the methods, processes, operations, or methodologies discussed herein. The order processing device 102, the network manager device 106, the manual fulfillment device 114 and/or the review device 116 may include the functionality of the one or more computer systems 1000.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 further includes a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a drive unit 1016, a signal generation device 1018 (e.g., a speaker) and a network interface device 1020.

The drive unit 1016 includes a computer-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting computer-readable media.

The software 1024 may further be transmitted or received over a network 1026 via the network interface device 1020.

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a system is provided with a holding section, a distribution section and a manual section. The holding section is adapted to hold the container during manual handling. The distribution section is adjacent the holding section and has a robot adapted to select and pick containers from the holding section. The robot is disposed to distribute the container. The manual section is disposed adjacent the conveyor. The manual section is adapted for inspection or filling of the container.

In an example embodiment, a prescription order having a plurality of order components is held. At least one of the order components is a container for prescription drugs. The container is selected from the prescription order. The prescription order is accessed to provide identifying data for the container. The identifying data identifies an attribute of the prescription order. The container is labeled with a label having the identifying data. The label of the container is scanned. The container is distributed to a manual handling area.

In an example embodiment, a prescription order having a plurality of order components is delivered. At least one of the order components is a container for prescription drugs. One of the order components is selected from the prescription order. The selected order component is scanned. Whether the selected order component should be inspected or filled manually is determined. The selected order component is distributed to a holding section or a manual handling area. The selected order component is returned to a return conveyor. The manually handled order component is combined with companion order components that were not manually handled to group the prescription order.

The present disclosure makes reference to a robot and words of similar import. A robot can be a machine capable of carrying out a complex series of actions automatically. These complex series of actions may include picking up, orientating, positioning and/or releasing a container or other structure. The robot may be dedicated to a single series of movements or may be able to execute multiple series of movements. A robot may include a processor that received instructions and then executes instructions to control its movement. In another example, a robot may resemble a human being and replicate certain human movements and functions, e.g., a robot may move location, have an articulated arm, have grasping structures that replicate like fingers and do not damage containers, and the like.

Thus, methods and systems for manual handling have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. A method comprising:
   scanning, by a scanner, a label of a container for a quantity of a prescription drug to obtain scanned data;
   determining, by a processor, whether the container is to be distributed to a manual handling section based on the scanned data;
   in response to the container being determined to be distributed to the manual handling section,
      distributing, by a robot, the container from a distribution section to the manual handling section for manual handling and distributing companion order components of the prescription drug from a plurality of order components to a holding section when the container is being manually handled;
      routing, by the robot, the container that has been manually handled from the manual handling section to the holding section via a delivery conveyor;
      combining, by the robot, the container containing the quantity of the prescription drug with the companion order components in the holding section to group a prescription order; and
      returning, by the robot, the prescription order to the distribution section via a return conveyor.

2. The method of claim 1, wherein the manual handling section, the distribution section, and the holding section are deployed within a high volume pharmacy system for delivering the prescription order including the plurality of order components, and wherein at least one of the plurality of order components being the container for the quantity of a prescription drug.

3. The method of claim 1, further comprising transmitting a confirmation code based on an operation that is completed in the manual handling section.

4. The method of claim 1, wherein combining the container with the companion order components in the holding section to group the prescription order comprises:
   identifying, in the holding section, a stationary pallet among a plurality of pallets that is associated with the container to group the prescription order.

5. The method of claim 4, further comprising:
   picking, by the robot, the container from the delivery conveyor; and
   placing the container on the stationary pallet.

6. The method of claim 4, further comprising:
   respectively assigning a position on the stationary pallet to the plurality of order components.

7. The method of claim 6, further comprising:
   indexing the position on the stationary pallet to track a location of the container to thereby facilitate returning the container to the stationary pallet after being manually handled.

8. The method of claim 6, further comprising:
   circulating, on a circulating conveyor, the stationary pallet within the holding section and awaiting the container being returned to the stationary pallet from the manual handling section.

9. The method of claim 1, wherein scanning the label of the container further comprises:
   capturing an image of the label of the container by an image sensor.

10. The method of claim 9, further comprising capturing the image of the label of the container by spinning the container for the image sensor to obtain scanned data.

11. A system comprising:
a scanner configured for scanning a label of a container for a quantity of a prescription drug to obtain scanned data;
a processor configured for determining whether the container is to be distributed to a manual handling section based on the scanned data; and
a robot disposed in a distribution section and configured for, in response to the container being determined to be distributed to the manual handling section,
distributing the container from the distribution section to the manual handling section for manual handling and distributing companion order components of the prescription drug from a plurality of order components to a holding section when the container is being manually handled;
routing the container that has been manually handled from the manual handling section to the holding section via a delivery conveyor;
combining the container containing the quantity of the prescription drug with the companion order components in the holding section to group a prescription order; and
returning the prescription order to the distribution section via a return conveyor.

12. The system of claim 11, wherein the manual handling section, the distribution section, and the holding section are deployed within a high volume pharmacy system for delivering the prescription order including the plurality of order components, and wherein at least one of the plurality of order components being the container for the quantity of a prescription drug.

13. The system of claim 11, further comprising a device disposed in the manual handling section and configured for transmitting a confirmation code based on an operation that is completed in the manual handling section.

14. The system of claim 11, wherein the robot comprises a reader configured for identifying, in the holding section, a stationary pallet among a plurality of pallets that is associated with the container to group the prescription order.

15. The system of claim 14, wherein the robot is further configured for:
picking the container from the delivery conveyor; and
placing the container on the stationary pallet.

16. The system of claim 15, wherein each of the plurality of order components is assigned a position on the stationary pallet.

17. The system of claim 16, wherein the position on the stationary pallet is indexed to track a location of the container to thereby facilitate returning the container to the stationary pallet after being manually handled.

18. The system of claim 16, the stationary pallet is circulated on a circulating conveyor within the holding section awaiting the container being returned to the stationary pallet from the manual handling section.

19. The system of claim 11, wherein the scanner is an image sensor configured for capturing an image of the label of the container.

20. The system of claim 19, wherein the robot is configured for spinning the container while the image sensor is capturing the image of the label of the container to obtain the scanned data.

* * * * *